(12) United States Patent
Recio, III et al.

(10) Patent No.: US 11,384,281 B2
(45) Date of Patent: Jul. 12, 2022

(54) METHODS FOR PREPARING INVERT EMULSIONS USING DIBASIC ESTER SOLVENTS

(71) Applicant: Halliburton Energy Services, Inc., Houston, TX (US)

(72) Inventors: Antonio Recio, III, Humble, TX (US); Gladys Rocio Montenegro-Galindo, Rochester, NY (US); Paul Ashcraft, Cypress, TX (US); Hong Sun, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 187 days.

(21) Appl. No.: 16/573,199

(22) Filed: Sep. 17, 2019

(65) Prior Publication Data

US 2020/0165510 A1    May 28, 2020

Related U.S. Application Data

(60) Provisional application No. 62/771,368, filed on Nov. 26, 2018.

(51) Int. Cl.
| | |
|---|---|
| *C09K 8/60* | (2006.01) |
| *E21B 43/26* | (2006.01) |
| *C08F 220/56* | (2006.01) |

(52) U.S. Cl.
CPC ............ *C09K 8/604* (2013.01); *C08F 220/56* (2013.01); *E21B 43/26* (2013.01); *C09K 2208/28* (2013.01)

(58) Field of Classification Search
None
See application file for complete search history.

(56) References Cited

U.S. PATENT DOCUMENTS

| | | | |
|---|---|---|---|
| 3,624,019 A | 11/1971 | Anderson et al. | |
| 3,734,873 A | 5/1973 | Anderson et al. | |
| 3,997,492 A | 12/1976 | Kane et al. | |
| 4,024,097 A | 5/1977 | Slovinsky et al. | |
| 4,147,681 A * | 4/1979 | Lim .......................... | C02F 1/54 524/813 |
| 4,525,496 A * | 6/1985 | Adaway ................. | C09K 8/584 523/337 |
| 6,476,168 B1 | 11/2002 | Dahanayake et al. | |
| 6,485,651 B1 | 11/2002 | Branning | |
| 7,429,625 B2 | 9/2008 | Harrington et al. | |
| 8,846,769 B2 | 9/2014 | Mallo et al. | |
| 9,044,622 B2 | 6/2015 | Carmichael et al. | |

(Continued)

*Primary Examiner* — John J Figueroa
(74) *Attorney, Agent, or Firm* — Thomas Rooney; C. Tumey Law Group PLLC

(57) ABSTRACT

Methods for preparing and using invert emulsions and treatment fluids including the invert emulsions are provided herein. In one or more embodiments, the methods of the present disclosure comprise providing an aqueous fluid comprising water and one or more water-soluble monomers; providing an oil-based fluid comprising a solvent and one or more polymerization surfactants, wherein the solvent comprises a linear or branched dibasic ester; combining the aqueous fluid and the oil-based fluid to form an invert emulsion that comprises an aqueous phase comprising the aqueous fluid and an oil phase comprising the oil-based fluid; and polymerizing at least a portion of the one or more water-soluble monomers in the invert emulsion.

16 Claims, 2 Drawing Sheets

(56) References Cited

U.S. PATENT DOCUMENTS

| | | | |
|---|---|---|---|
| 9,365,764 B2 * | 6/2016 | Bobier | C09K 8/68 |
| 9,708,562 B2 | 7/2017 | Soane et al. | |
| 9,822,297 B2 | 11/2017 | Brinkman et al. | |
| 9,957,437 B2 | 5/2018 | Li et al. | |
| 2007/0032386 A1 * | 2/2007 | Abad | C09K 8/5751 |
| | | | 507/201 |
| 2009/0281012 A1 * | 11/2009 | Trivedi | C08G 65/3314 |
| | | | 510/138 |
| 2010/0163228 A1 * | 7/2010 | Abad | C09K 8/5751 |
| | | | 166/270.1 |
| 2014/0144643 A1 | 5/2014 | Frederick et al. | |
| 2016/0230522 A1 * | 8/2016 | Daniel | E21B 43/24 |

* cited by examiner

METHODS FOR PREPARING INVERT EMULSIONS USING DIBASIC ESTER SOLVENTS

CROSS-REFERENCE TO RELATED APPLICATION

This application claims priority from U.S. Provisional Application Ser. No. 62/771,368, entitled "METHODS FOR PREPARING INVERT EMULSIONS USING DIBASIC ESTER SOLVENTS," filed on Nov. 26, 2018, the entire disclosure of which is incorporated herein by reference.

BACKGROUND

The present disclosure relates to compositions for treating a subterranean formation and methods of preparing and using the same.

Treatment fluids may be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations may include, for example, fracturing operations, gravel packing operations, acidizing operations, scale dissolution and removal, consolidation operations, and the like. For example, a fluid may be used to drill a well bore in a subterranean formation or to complete a well bore in a subterranean formation, as well as numerous other purposes.

Friction reducers are often included in treatment fluids during pumping into a wellbore penetrating a subterranean formation to minimize damage to the formation. Generally, friction reducers comprise a chemical additive that functions to alter the rheology of the treatment fluid by reducing the friction and, depending on the nature of the friction reducer, increasing the viscosity of the treatment fluid. Friction reducers may be high molecular weight polymers, such as those having a molecular weight of at least about 2,500,000. Such polymers may be linear and flexible. Suitable friction reducers include certain water-soluble polymers.

One example of a treatment fluid that may utilize a friction reducer is a fracturing fluid used in hydraulic fracturing. Hydraulic fracturing is a process commonly used to increase the flow of desirable fluids, such as oil and gas, from a portion of a subterranean formation. In hydraulic fracturing, a fracturing fluid may be introduced into the subterranean formation at or above a pressure sufficient to create or enhance one or more fractures in the formation. Enhancing a fracture may include enlarging a pre-existing fracture in the formation. Friction reducers may be included in the fracturing fluid to reduce frictional energy losses within the fluid and to increase the viscosity under low shear forces, such as within fractures, to aid in the placement of proppant particulates in the fractures.

BRIEF DESCRIPTION OF THE DRAWINGS

These drawings illustrate certain aspects of some of the embodiments of the present disclosure and should not be used to limit or define the claims.

Figure 1:
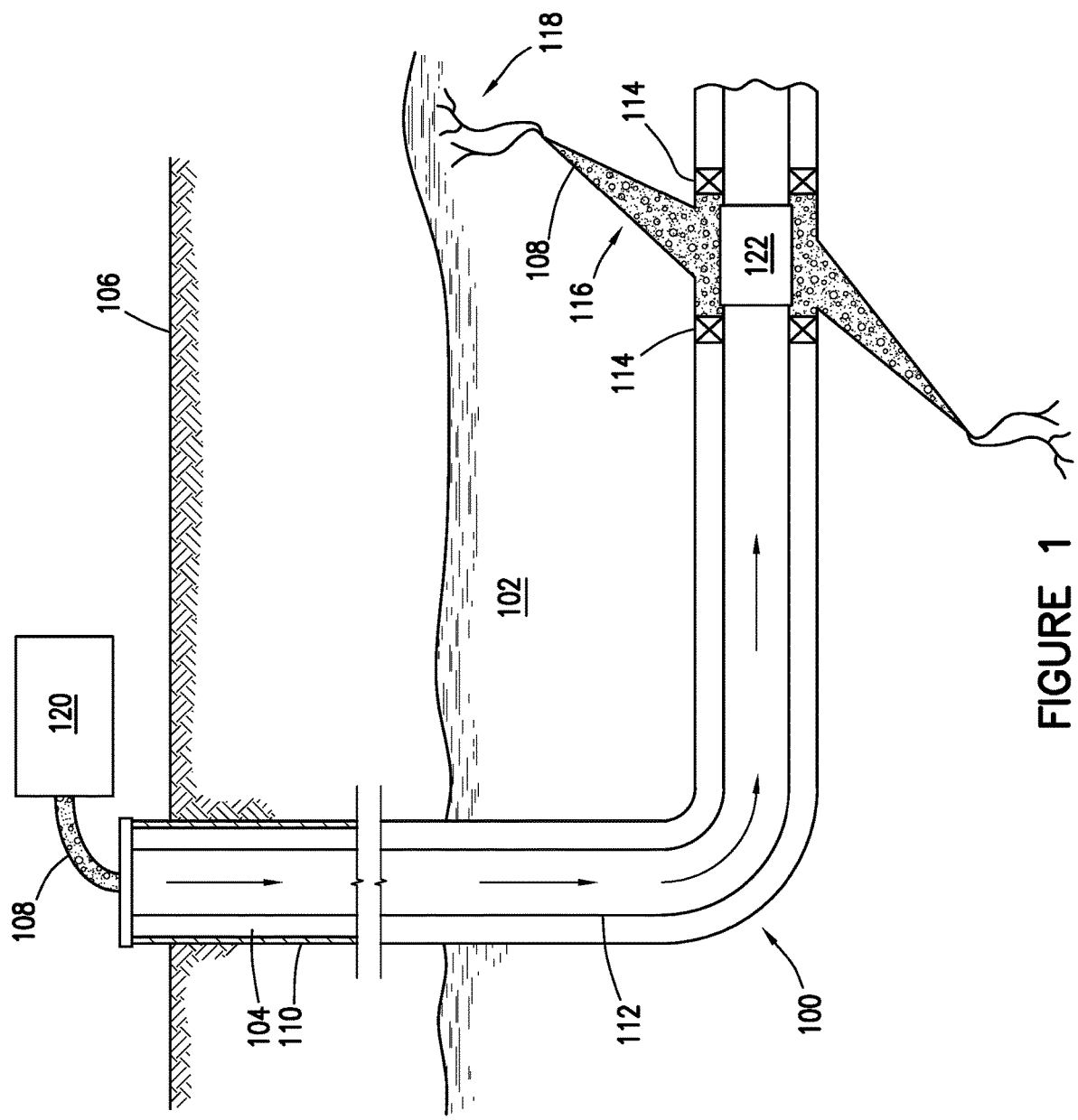
FIG. 1 is a diagram illustrating an example of a subterranean formation in which a fracturing operation may be performed in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to compositions for treating a subterranean formation and methods for preparing and using the same. More particularly, the present disclosure relates to certain invert emulsions and methods of preparing and using the same.

The present disclosure provides invert (e.g., water-in-oil) emulsions comprising an aqueous phase that comprises an aqueous fluid and an oil phase that comprises an oil-based fluid. In certain embodiments, the aqueous fluid may comprise one or more water-soluble monomers. In certain embodiments, the water-in-oil emulsions of the present disclosure may also comprise one or more surfactants (e.g., an inverting surfactant, a polymerization surfactant).

The present disclosure also provides methods of preparing the invert emulsions of the present disclosure. In certain embodiments, the methods may comprise dissolving one or more water-soluble monomers in an aqueous fluid, mixing an oil-based fluid and one or more polymerization surfactants, and mixing the aqueous fluid and the oil-based fluid to form an invert emulsion that comprises an internal (or discontinuous) aqueous phase comprising the aqueous fluid and an external (or continuous) oil phase comprising the oil-based fluid. In some embodiments, the methods may comprise polymerizing the water-soluble monomers, which may be initiated using an initiator. In some embodiments, the methods may comprise adding one or more inverting surfactants to the invert emulsion.

Among the many potential advantages to the methods and compositions of the present disclosure, only some of which are alluded to herein, the methods and compositions of the present disclosure, and/or the additives prepared using those methods and compositions, may provide for increased viscosity of treatment fluids while maintaining friction reduction abilities (e.g., turbulence reduction), which, in some embodiments, may do so without requiring high friction reducer concentrations. The methods and compositions of the present disclosure may also provide for improved suspension of proppant within treatment fluids and/or improved placement of proppant in fractures within subterranean formation.

The invert emulsions of the present disclosure may include an aqueous fluid, e.g., an aqueous phase. Such aqueous fluids may include fresh water, salt water (e.g., water containing one or more salts dissolved therein), brine (e.g., saturated salt water), brackish water, seawater, produced water (e.g., water produced from the same formation where the method of the present disclosure is being conducted), or any combination thereof. The aqueous fluid may be any suitable proportion of the invert emulsion as will be appreciated by one of skill in the art with the benefit of this disclosure. In certain embodiments, the aqueous fluid may be present in the invert emulsion in an amount from about 0.01% to about 50% by volume of the invert emulsion. In other embodiments, the aqueous fluid may be present in the invert emulsion in an amount from about 10% to about 40% by volume of the invert emulsion. In other embodiments, the aqueous fluid may be present in the invert emulsion in an amount from about 20% to about 30% by volume of the invert emulsion.

In certain embodiments, the aqueous fluid may be a salt aqueous fluid or brine. In such embodiments, the salt may be any suitable salt, such as at least one of NaBr, KBr, NH$_4$Br, CaCl$_2$, CaBr$_2$, ZnBr$_2$, KCl, NaCl, NH$_4$Cl, a carbonate salt, a sulfonate salt, a sulfite salt, a sulfide salt, a phosphate salt, a phosphonate salt, a magnesium salt, a bromide salt, a formate salt, an acetate salt, and a nitrate salt. In certain embodiments, the aqueous fluid may have any suitable total dissolved solids level, as will be appreciated by one of skill in the art with the benefit of this disclosure, such as about 1,000 mg/L to about 250,000 mg/L, or about 1,000 mg/L or less, or about 5,000 mg/L, 10,000, 15,000, 20,000, 25,000, 30,000, 40,000, 50,000, 75,000, 100,000, 125,000, 150,000, 175,000, 200,000, 225,000, or about 250,000 mg/L or more. In certain embodiments, the aqueous fluid may have any suitable salt concentration, as will be appreciated by one of skill in the art with the benefit of this disclosure, such as about 1,000 ppm to about 300,000 ppm, or about 1,000 ppm to about 150,000 ppm, or about 1,000 ppm or less, or about 5,000 ppm, 10,000, 15,000, 20,000, 25,000, 30,000, 40,000, 50,000, 75,000, 100,000, 125,000, 150,000, 175,000, 200, 000, 225,000, 250,000, 275,000, or about 300,000 ppm or more. In certain embodiments, the aqueous fluid may have a concentration of at least one salt from about 0.1% to about 20% by volume of the aqueous fluid. In other embodiments, the aqueous fluid may have a concentration of at least one salt from about 0.1%, or less, to about 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30% by volume of the aqueous fluid. In various embodiments, the invert emulsion may be an emulsion that is stable under conditions of high salinity in the aqueous phase of the invert emulsion, such as any level of salinity described herein.

The invert emulsions of the present disclosure may include an oil, e.g., an oil phase that comprises an oil-based fluid. The oil phase and/or oil-based fluid may form any suitable proportion of the invert emulsion as will be appreciated by one of skill in the art with the benefit of this disclosure. In certain embodiments, the oil may be present in the invert emulsion in an amount from about 50% to about 99.99% by volume of the invert emulsion. In other embodiments, the oil may be present in the invert emulsion in an amount from about 50% to about 90% by volume of the invert emulsion. In other embodiments, the oil may be present in the invert emulsion in an amount from about 60% to about 80% by volume of the invert emulsion.

The oil phase and/or oil-based fluid may include one or more solvents. In certain embodiment, the oil phase and/or oil-based fluid may comprise a solvent selected from the group consisting of: methyl 9-decenoate, methyl 9-dodecenoate, N,N-dimethyl 9-decenamide, diethyl carbonate, triethyl citrate, dimethyl 2-methylglutarate, dodecyl acetate, 1-dodecyl-2-pyrrolidinone, 2-dodecyl-pyrrolidinone, N—(C$_2$H$_4$)$_n$CH$_3$-pyrrolidinone (wherein n is from about 1 to about 22), dimethyl succinate, dimethyl glutarate, dimethyl adipate, n-octyl-pyrrolidinone, dibutyl ether, isoamyl ether, di-n-amyl ether, dihexyl ether, heptyl ether, dioctyl ether, dodecyl ether, benzyl hexyl ether, di-n-alkyl-ethers having the formula O[(CH$_2$)$_x$CH$_3$]$_2$ (wherein x is from about 3 to about 35), a linear or branched dibasic ester having the formula CH$_3$OC(O)(CH$_2$)$_x$C(O)OCH$_3$ (wherein x is from about 2 to about 10), CH$_3$OC(O)(CH$_2$)$_x$CHCH$_3$(CH$_2$)$_y$C(O)OCH$_3$ (wherein x and y are each independently from about 2 to about 10), CH$_3$OC(O)(CH$_2$)$_x$C(CH$_3$)$_2$(CH$_2$)$_y$C(O)OCH$_3$ (wherein x and y are each independently from about 2 to about 10), a linear or branched dibasic ester having structure

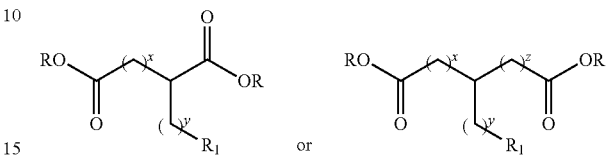

(wherein x and z are each independently from about 0 to about 10, wherein y is from about 0 to about 6, wherein each R is independently selected from the group consisting of methyl, ethyl, n-propyl, iso-propyl, n-butyl, and sec-butyl, and wherein R$_1$ is H or CH$_3$), and any combination thereof. In certain embodiments, the oil phase and/or oil-based fluid may comprise a solvent selected from the group consisting of: (a) CH$_3$OC(O)(CH$_2$)$_x$C(O)OCH$_3$, wherein x is from about 2 to about 10, (b) CH$_3$OC(O)(CH$_2$)$_x$CHCH$_3$(CH$_2$)$_y$C(O)OCH$_3$, wherein x and y are each independently from about 2 to about 10, (c) CH$_3$OC(O)(CH$_2$)$_x$C(CH$_3$)$_2$(CH$_2$)$_y$C(O)OCH$_3$, x and y are each independently from about 2 to about 10, (d)

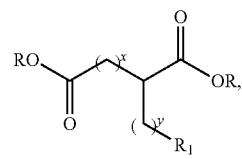

wherein x is from about 0 to about 10, wherein y is from about 0 to about 6, wherein each R is independently selected from the group consisting of: methyl, ethyl, n-propyl, iso-propyl, n-butyl, and sec-butyl, and wherein R$_1$ is H or CH$_3$, (e)

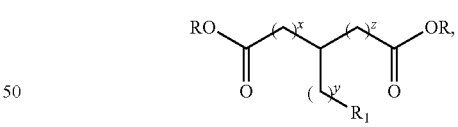

wherein x and z are each independently from about 0 to about 10, wherein y is from about 0 to about 6, wherein each R is independently selected from the group consisting of: methyl, ethyl, n-propyl, iso-propyl, n-butyl, and sec-butyl, and wherein R$_1$ is H or CH$_3$, and (f) any combination thereof. In certain embodiments, the oil phase and/or oil-based fluid may comprise a solvent selected from the group consisting of: a linear dibasic ester, a branched dibasic ester, and any combination thereof. In certain embodiments, the oil phase and/or oil-based fluid may comprise a solvent selected from the group consisting of: dimethyl 2-methylglutarate, 1-dodecyl-2-pyrrolidinone, N—(C$_2$H$_4$)$_n$CH$_3$-pyrrolidinone (wherein n is from about 6 to about 12), dimethyl succinate, dimethyl glutarate, dimethyl adipate, and combinations thereof. In other embodiments, the solvent may be a dibasic ester. In other embodiments, the solvent may be dimethyl 2-methylglutarate.

In certain embodiments, the invert emulsions of the present disclosure may include both an aqueous phase and an oil phase, as described above. In some embodiments, the aqueous phase and the oil phase may be separate in the invert emulsion (e.g., not mixed). In other embodiments, the aqueous phase and the oil phase may be combined in the invert emulsion as an emulsion of the aqueous phase and the oil phase. In such embodiments, the invert emulsion may be any suitable emulsion.

The size (e.g., the largest dimension) of the droplets of the inner phase (e.g., aqueous phase) of the invert emulsion within the outer phase (e.g., oil phase) of the invert emulsion may be any suitable size as will be appreciated by one of skill in the art with the benefit of this disclosure. In certain embodiments, the size of the droplets may be from about 0.001 micron to about 5 mm. In other embodiments, the size of the droplets may be from about 1 micron to about 1,000 microns. In other embodiments, the size of the droplets may be from about 0.005 microns to about 100 microns. In other embodiments, the size of the droplets may be from about 0.005 microns to about 0.3 microns. In other embodiments, the size of the droplets may be from about 0.01 microns to about 0.15 microns. In other embodiments, the size of the droplets may be from about 0.001 microns, or less, to about 0.005 microns, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.25, 0.3, 0.35, 0.4, 0.45, 0.5, 1, 2, 3, 4, 5, 6, 8, 10, 15, 20, 25, 50, 75, 100, 125, 150, 175, 200, 250, 300, 350, 400, 450, 500, 600, 700, 800, 900 microns, 1 mm, 2, 3, 4 mm, or about 5 mm. In certain embodiments, the invert emulsion may be a microemulsion, with a size of the droplets of the inner phase of the invert emulsion within the outer phase of the invert emulsion being from about 0.001 microns to about 1,000 microns, from about 1 micron to about 1,000 microns, or from about 1 micron to about 100 microns.

The aqueous fluids and/or invert emulsions of the present disclosure may comprise one or more water-soluble monomers. In certain embodiments, the water-soluble monomers may be anionic, cationic, non-ionic, or any combination thereof. In certain embodiments, the anionic monomers may include, but are not limited to, acrylic acid, 2-acrylamido-2-methylpropane sulfonic acid, 2-(meth)acrylamido-2-methylpropane sulfonic acid, 2-amino-2-methyl-1-propanol (AMP), any salt thereof (e.g., sodium salt), and any combination thereof. In certain embodiments, the cationic monomers may include, but are not limited to, [2-(acryloyloxy)ethyl]trimethylammonium chloride (AETAC), methacrylamidopropyl trimethyl ammonium chloride, acrylamidopropyl trimethyl ammonium chloride, methacrylamido-4,4,8,8-tetramethyl-4,8-diaza-6-hydroxylnonamethylene dichloride (MDTHD), diallyldimethyl ammonium chloride (DADMAC), any salt thereof, and any combination thereof. In certain embodiments, the non-ionic monomers may include, but are not limited to, acrylamide (including alkyl-, aryl-, alkenyl-, and di-substituted derivatives thereof), ($C_1$ to $C_{30}$) acrylic esters, methacrylamide (including alkyl-, aryl-, alkenyl-, and di-substituted derivatives thereof), ($C_1$ to $C_{30}$) methacrylic esters, any salt thereof, and any combination thereof.

The invert emulsions of the present disclosure may comprise one or more polymerization surfactants. In certain embodiments, the polymerization surfactant may be mixed into the oil-based fluid and/or oil phase of the invert emulsion. In certain embodiments, the polymerization surfactant may be a surfactant having a hydrophilic-lipophilic balance ("HLB") value between about 3 and about 7. In certain embodiments, the polymerization surfactants may include, but are not limited to, fatty acid esters of the following: (i) mono-, di- and polyglycerols, such as monoleate, dioleate, monostearate, distearate, and palmistearate; (ii) sorbitan, such as sorbitan monoleate, sorbitan dioleate, sorbitan trioleate, sorbitan monostearate, and sorbitan tristearate; (iii) mannitol, such as mannitol monolaurate and mannitol monopalmitate; (iv) pentaerythritol, such as pentaerythritol monomyristate, pentaerythritol monopalmitate, and pentaerythritol dipalmitate; (v) polyethylene glycol mannitol, as well as monooleate and glucose monostearate; (vi) polyethylene glycol mannitol, as well as monooleates and trioleates; (vii) glucose, such as glucose monooleate and glucose monostearate; (viii) glycerol sorbitan; and any combination thereof. In such embodiments, the fatty acid esters of mono-, di- and polyglycerols may be obtained from the esterification of mono-, di-, and polyglycerols, or mixtures of polyhydroxylated alcohols, such as ethylene glycol, diethylene glycol, dipropylene glycol, 1,4-butanediol, 1,2,4-butanetriol, glycerol, trimethylolpropane, sorbitol, neopentyl glycol and pentaerythritol. In certain embodiments, the polymerization surfactants may include, but are not limited to, trimethylolpropane distearate; products of a reaction between isopropylamdie oleic acid; ethoxylated alkylaines; sodium hexadecyl phthalate; sodium decyl phthalate; oil-soluble alkanolamides; ethoxylated non-ionic surfactants, and guerbet alcohol ethoxylate; tall oil fatty acid diethanolamide, available as AMADOL 511; polyoxyethylene (5) sorbitan monooleate, available as TWEEN 81; sorbinate monooleate, available as SPAN 80, and any combination thereof.

The one or more polymerization surfactants may be provided or present in any suitable proportion of the invert emulsion as will be appreciated by one of skill in the art with the benefit of this disclosure. In certain embodiments, the one or more polymerization surfactants may be provided or present in the invert emulsion in an amount from about 0.01% to about 50% by volume of the invert emulsion. In other embodiments, the one or more polymerization surfactants may be provided or present in the invert emulsion in an amount from about 0.05% to about 40% by volume of the invert emulsion. In other embodiments, the one or more polymerization surfactants may be provided or present in the invert emulsion in an amount from about 0.1% to about 10% by volume of the invert emulsion. In other embodiments, the one or more polymerization surfactants may be provided or present in the invert emulsion in an amount from about 0.1% to about 5% by volume of the invert emulsion.

The invert emulsions of the present disclosure may comprise one or more inverting surfactants. In certain embodiments, the inverting surfactants may include, but are not limited to, tall oil fatty acid diethanolamides, ethoxylated alcohols, and other surfactants having a similar HLB, or any combination thereof. The one or more inverting surfactants may be provided or present any suitable proportion of the invert emulsion as will be appreciated by one of skill in the art with the benefit of this disclosure. In certain embodiments, the one or more inverting surfactants may be provided or present in the invert emulsion in an amount from about 0.01% to about 50% by volume of the invert emulsion. In other embodiments, the one or more inverting surfactants may be provided or present in the invert emulsion in an amount from about 0.05% to about 10% by volume of the invert emulsion. In other embodiments, the one or more inverting surfactants may be present in the invert emulsion in an amount from about 0.1% to about 5% by volume of the invert emulsion. In other embodiments, the one or more inverting surfactants may be present in the invert emulsion in an amount from about 0.1% to about 2% by volume of the invert emulsion.

The invert emulsions of the present disclosure may comprise one or more initiators that may be suitable for initiating polymerization of the one or more water-soluble monomers. In certain embodiments, the initiators used in the compositions and methods of the present disclosure may be oil soluble, and may be provided in the oil-based fluid and/or oil-phase of the invert emulsion. In certain embodiments, the initiator may comprise a "thermal" decomposition initiator, a diazo radical initiator, a redox initiator, a persulfate initiator (e.g., potassium persulfate, ammonium persulfate), hydrogen peroxide, and/or any combination thereof.

Examples of suitable oil-soluble thermal decomposition initiators (with their decomposition temperatures) include, but are not limited to, 2,2'-azobis(4-methoxy-2,4-dimethyl-valeronitrile (about 30-45° C.), 2,2'-azobis(4-methyl-2,4-dimethylvaleronitrile (about 50-59° C.), 2,2'-azobis(isobutyronitrile) (about 60-70° C.), dimethyl 2,2'-azobis(2-methylpropionate) (about 60-70° C.), 2-2'-azobis(2-methylbutyronitrile) (about 80-99° C.), 1,1'-azobis(cyclohexane-1-carbonitrile) (above about 100° C.), and 2,2'-azobis(N-butyl-2-methylpropionamide) (above about 100° C.). Examples of suitable water-soluble thermal decomposition initiators (with their decomposition temperatures) include, but are not limited to, 2-2'-azobis[2-(2-imidazolin-2-yl)propane]dihydrochloride (about 30-45° C.), 2,2'-azobis(2-methylpropionamidine)hydrochloride (about 50-59° C.), 2,2'-azobis[N-(2-carboxyethyl)-2-methylpropionamidine] tetrahydrate (about 50-59° C.), 2,2'-azobis[2-(2-imidazolin-2-yl)propane] (about 60-70° C.), 4,4'-azobis(4-cyanovaleric acid) (about 60-70° C.), and 2,2'-azobis[2-methyl-N-(2-hydroxyl)propionamide] (about 80-99° C.). In one or more embodiments, a redox initiator, a persulfate initiator or hydrogen peroxide may be reacted with one or more salt containing iron, chromium, vanadium, titanium, cobalt, and/or copper to generate one or more hydroxyl or alkyloxy radicals to initiate polymerization of the one or more water-soluble monomers.

In certain embodiments, the initiator may be provided or present in the invert emulsion in an amount from about 0.0001% to about 5% by volume of the invert emulsion. In other embodiments, the initiator may be provided or present in the invert emulsion in an amount from about 0.001% to about 1% by volume of the invert emulsion. In other embodiments, the initiator may be provided or present in the invert emulsion in an amount from about 0.001% to about 0.5% by volume of the invert emulsion.

The methods of the present disclosure include methods for preparing invert emulsions. In certain embodiments, the aqueous fluid may be prepared by dissolving one or more water-soluble monomers in an aqueous phase. In certain embodiments, the oil-based fluid may be prepared by adding or mixing one or more polymerization surfactants into the solvent of the oil phase. The aqueous fluid and oil-based fluid may be combined in any suitable fashion and by any suitable means. In certain embodiments, the two fluids or phases may be mixed under high shear (e.g., 500 to 8,000 rpm) to form an invert (i.e., water-in-oil) emulsion. In some embodiments, the invert emulsion may be degassed and/or purged with nitrogen to remove any residual oxygen. In such embodiments, the degassing and/or purging may be performed one stable dispersion of the water droplets of the aqueous phase in the oil phase has occurred.

In certain embodiments, the methods of the present disclosure may comprise polymerization of the water-soluble monomers. In certain embodiments, the water-soluble monomers of the present disclosure may polymerize to form a polyacrylamide-based material. The polyacrylamide-based material may comprise any of the water-soluble monomers disclosed herein or any combinations thereof. The polyacrylamide-based material may be anionic, cationic, amphoteric, and any combinations thereof. In certain embodiments, the polyacrylamide-based material may be added to a treatment fluid, which in turn may be introduced into at least a portion of a subterranean formation. In certain embodiments, the polyacrylamide-based material may act as a friction reducer when introduced into a subterranean formation in accordance with certain embodiments of the present disclosure.

In some embodiments, the invert emulsion may be heated to a temperature from about 38° C. to about 60° C. depending, at least in part, on the reactive nature and concentration of the water-soluble monomers. In such embodiments, the invert emulsion may be heated for a period of time, such as from about 4 hours to about 12 hours. In some embodiments, the polymerization may be initiated at a temperature of about 25° C. via a redox coupling reaction. The temperature at which polymerization is initiated may depend on the type of initiator, as one of ordinary skill in the art will appreciate with the benefit of this disclosure. In some embodiments, an initiator, such as a diazo radical initiator, may be added to the invert emulsion. In such embodiments, as the invert emulsion is heated, the initiator may decompose to facilitate polymerization of the water-soluble monomers. In certain embodiments, the invert emulsion may be cooled to room temperature upon completion of the polymerization.

In certain embodiments, an inverting surfactant may be added to the invert emulsion upon completion of the polymerization. In some embodiments, the inverting surfactant may be added to the invert emulsion upon completion of the polymerization. In other embodiments, the inverting surfactant may be added to the invert emulsion at or near a wellsite prior to the invert emulsion being added to a treatment fluid (as discussed below).

In certain embodiments, the water-soluble monomers (or moieties thereof) may not completely polymerize or react. In such embodiments, any unreacted water-soluble monomers (or moieties thereof) may be deactivated, for example, with sodium bisulfate. The concentration of sodium bisulfate or other deactivating additive will depend, at least in part, on the concentration or amount of unreacted water-soluble monomers (or moieties thereof), as one of ordinary skill in the art will appreciate with the benefit of this disclosure.

The invert emulsions of the present disclosure may be added to a treatment fluid. The treatment fluids of the present disclosure may include any aqueous base fluid known in the art. The term "base fluid" refers to the major component of the fluid (as opposed to components dissolved and/or suspended therein), and does not indicate any particular condition or property of that fluids such as its mass, amount, pH, etc. Upon introduction into the aqueous base fluid, or a short time thereafter, the inverting surfactant in the invert emulsion may cause the invert emulsion to invert within the treatment fluid.

Aqueous fluids that may be suitable for use in the treatment fluids comprising invert emulsions of the present disclosure may include water from any source. Such aqueous fluids may include fresh water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. For example, seawater and/or produced water may include a variety of divalent cationic species dissolved therein. In certain embodiments, the one or more ionic species may be selected from the group consisting of: H, Li, Na, K, Cs, Be, Mg, Ca, Sr, Ba, Cr, Fe, Mn, Co, Ni, Cu, Ga, In, $NH_4$, and any combination thereof. In certain embodiments, the density of the aqueous fluid may be adjusted, among other purposes, to provide additional particulate transport and suspension in the compositions of the present disclosure. In certain embodiments, the treatment fluids may include a mixture of one or more aqueous fluids with other fluids and/or gases, including but not limited to emulsions, foams, and the like. In certain embodiments, the pH of the base fluid may be adjusted (e.g., by a buffer or other pH adjusting agent) to a specific level.

In certain embodiments, the treatment fluids of the present disclosure may comprise one or more invert emulsions of the present disclosure in an amount from about 0.005% to about 5% by volume of the base fluid. In other embodiments, the treatment fluids may comprise one or more invert emulsions of the present disclosure in an amount from about 0.005% to about 1% by volume of the base fluid. In other embodiments, the treatment fluids may comprise one or more invert emulsions of the present disclosure in an amount from about 0.1% to about 0.2% by volume of the base fluid.

In certain embodiments, the treatment fluids of the present disclosure may comprise proppant particulates. Examples of materials that may be suitable for use as proppant particulates in certain embodiments of the present disclosure include, but are not limited to, fly ash, silica, alumina, fumed carbon (e.g., pyrogenic carbon), carbon black, graphite, mica, titanium dioxide, metalsilicate, silicate, kaolin, talc, zirconia, boron, hollow microspheres (e.g., spherical shell-type materials having an interior cavity), glass, sand, bauxite, sintered bauxite, ceramic, calcined clays (e.g., clays that have been heated to drive out volatile materials), partially calcined clays (e.g., clays that have been heated to partially drive out volatile materials), composite polymers (e.g., thermoset nanocomposites), halloysite clay nanotubes, and any combination thereof. The proppant particulates may be of any shape (regular or irregular) suitable or desired for a particular application. In some embodiments, the proppant particulates may be round or spherical in shape, although they may also take on other shapes such as ovals, capsules, rods, toroids, cylinders, cubes, or variations thereof. In certain embodiments, the proppant particulates of the present disclosure may be relatively flexible or deformable, which may allow them to enter certain perforations, microfractures, or other spaces within a subterranean formation whereas solid particulates of a similar diameter or size may be unable to do so.

In certain embodiments, the treatment fluid may comprise the proppant particulates in an amount from about 0.1 to about 10 pounds of particulates/gallon of treatment fluid (ppg). In other embodiments, the treatment fluid may comprise the proppant particulates in an amount from about 0.1 ppg to about 5.0 ppg. In other embodiments, the treatment fluid may comprise the proppant particulates in an amount from about 0.1 ppg to about 0.5 ppg, in other embodiments, about 0.5 ppg to about 1.0 ppg, in other embodiments, about 1.0 ppg to about 2.0 ppg, in other embodiments, about 2.0 ppg to about 3.0 ppg, in other embodiments, about 3.0 ppg to about 4.0 ppg, in other embodiments, about 4.0 ppg to about 5.0 ppg, in other embodiments, about 5.0 ppg to about 6.0 ppg, in other embodiments, about 6.0 ppg to about 7.0 ppg, in other embodiments, about 7.0 ppg to about 8.0 ppg, in other embodiments, about 8.0 ppg to about 9.0 ppg, and in other embodiments, about 9.0 ppg to about 10 ppg.

In certain embodiments, the treatment fluids of the present disclosure may include any number of additives. Examples of such additives include, but are not limited to, salts, surfactants, acids, diverting agents, fluid loss control additives, gas, nitrogen, carbon dioxide, surface modifying agents, tackifying agents, foamers, corrosion inhibitors, scale inhibitors, catalysts, clay stabilizers, shale inhibitors, biocides, friction reducers, antifoam agents, bridging agents, flocculants, $H_2S$ scavengers, $CO_2$ scavengers, oxygen scavengers, lubricants, hydrocarbons, viscosifying/gelling agents, breakers, weighting agents, relative permeability modifiers, resins, wetting agents, coating enhancement agents, filter cake removal agents, antifreeze agents (e.g., ethylene glycol), particulates, and the like. A person skilled in the art, with the benefit of this disclosure, will recognize the types of additives that may be included in the treatment fluids of the present disclosure for a particular application. In certain embodiments, the treatment fluids of the present disclosure may include additional surfactants and/or a scale inhibitor.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the invert emulsion and/or other components of the treatment fluid may be metered directly into a base fluid to form a treatment fluid. In certain embodiments, the base fluid may be mixed with the invert emulsion and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted.

The treatment fluids of the present disclosure may be introduced into a portion of a subterranean formation. The treatment fluid may be, for example, a stimulation fluid, a hydraulic fracturing fluid, a drilling fluid, a spotting fluid, a clean-up fluid, a completion fluid, a remedial treatment fluid, a workover fluid, an abandonment fluid, a pill, an acidizing fluid, a cementing fluid, a packer fluid, a logging fluid, or a combination thereof. In introducing a treatment fluid of the present disclosure into a portion of a subterranean formation, the components of the treatment fluid may be mixed together at the surface (or offsite prior to transport to the wellsite) and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure. In some embodiments, the invert emulsion and/or the various other components of the treatment fluids of the present disclosure may be mixed into the treatment fluid during some stages but not others.

The present disclosure in some embodiments provides methods for using the treatment fluids to carry out hydraulic fracturing treatments (including fracture acidizing treatments). In certain embodiments, a treatment fluid may be introduced into a subterranean formation. In some embodiments, the treatment fluid may be introduced into a wellbore that penetrates a subterranean formation. In some embodiments, the treatment fluid may be introduced at a pressure sufficient to create or enhance one or more fractures within the subterranean formation. In some embodiments, the treatment fluid may be introduced using one or more pumps. The treatment fluids used in these fracturing treatments may include a number of different types of fluids, including but not limited to pre-pad fluids, pad fluids, fracturing fluids, slickwater fluids, proppant-laden fluids, and the like.

FIG. 1 shows a well 100 during a fracturing operation in a portion of a subterranean formation of interest 102 surrounding a wellbore 104. The wellbore 104 extends from the surface 106, and the treatment fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the wellbore 104. A pump and blender system 120, which may include blender 110, is coupled a work string 112 to pump the treatment fluid 108 into the wellbore 104. The working string 112 may include coiled tubing, jointed pipe, and/or other structures that allow fluid to flow into the wellbore 104. The working string 112 can include flow control devices 122 (e.g., bypass valves, ports, and or other tools or well devices) that control a flow of fluid from the interior of the working string 112 into the subterranean zone 102. For example, the working string 112 may include ports adjacent the wellbore wall to communicate a treatment fluid 108 (e.g., fracturing fluid, pad fluids, pre-pad fluids, spacer fluids, as well as other fluids) directly into the subterranean formation 102, and/or the working string 112 may include ports that are spaced apart from the wellbore wall to communicate treatment fluid 108 and/or other fluids into an annulus in the wellbore between the working string 112 and the wellbore wall. The working string 112 and/or the wellbore 104 may include one or more sets of packers 114 that seal the annulus between the working string 112 and wellbore 104 to define an interval of the wellbore 104 into which a treatment fluid 108 or other fluids will be pumped. FIG. 1 shows two packers 114, one defining an uphole boundary of the interval and one defining the downhole end of the interval.

In certain embodiments, the treatment fluid 108 may be introduced into the wellbore 104 at or above at or above a certain hydraulic pressure. In such embodiments, when the treatment fluid 108 (e.g., a fracturing fluid) is pumped into the desired interval of the wellbore 104 at or above a certain hydraulic pressure, the rock of the subterranean zone 102 "fractures," in that one or more fractures or cracks are created in the zone or one or more existing fractures or cracks in the zone 102 are enlarged or enhanced. In the embodiments shown, the rock matrix of the subterranean zone 102 is of a type that, when fractured, produces both a primary fracture 116 in the near field and secondary fractures 118 (e.g., induced, dendritic fractures or microfractures) in the far field. The secondary fractures 118 have propagated from or near the ends and edges of the primary fracture 116. In certain instances, the subterranean zone 102 is a low permeability zone having a permeability of 1 mD or less. For example, the subterranean zone 102 can include a shale, tight gas, clay, and/or coal bed formation. In certain instances, the rock matrix of the subterranean zone 102 may include cleating or natural fractures (i.e., those that existed prior to, and were not caused by, a fracture treatment). The natural fractures tend to run generally in a direction that is parallel to the primary fracture 116. The secondary fractures 118 run in many directions including directions non-parallel and, in certain instances, perpendicular to the direction of the primary fracture 116. As a result, the secondary fracture 118 can cross, and thereby link, the natural fractures to the primary fracture 116. In certain embodiments, the proppant particulates in the treatment fluid 108 may enter and/or be deposited within one or more of the primary fracture 116 and/or the secondary fractures 108.

To facilitate a better understanding of the present disclosure, the following examples of certain aspects of certain embodiments are given. The following examples are not the only examples that could be given according to the present disclosure and are not intended to limit the scope of the disclosure or claims.

Example

As shown in Table 1 below, four fluid samples were prepared comprising 250 mL of Houston tap water and 0.4% of a polyacrylamide-based friction reducer of the present disclosure by volume of the sample. Sample 1 contained only these components. Sample 2 further contained 0.1% of a dewatering agent comprising an oil-based fluid comprising dimethyl 2-methylglutarate, a co-solvent comprising isopropanol, an ethoxylated alcohol comprising a $C_{12}$-$C_{14}$ ethoxylated alcohol 7EO, a resin alkoxylated oligomer comprising phenol formaldehyde with methyloxirane and oxirane, and a polyamine polyether comprising an alkoxylated polyamine. Sample 3 further contained 0.02% of an oil-based fluid comprising a linear dibasic ester comprising a mixture of dimethyl succinate, dimethyl glutarate, and dimethyl adipate. Sample 4 further contained 0.02% of an oil-based fluid comprising dimethyl 2-methylglutarate.

TABLE 1

| Component | Sample | | | |
|---|---|---|---|---|
| (% by volume of sample) | 1 | 2 | 3 | 4 |
| Houston Tap Water | 250 mL | 250 mL | 250 mL | 250 mL |
| Friction Reducer | 0.4% | 0.4% | 0.4% | 0.4% |
| Branched Dibasic Ester Solvent | — | 0.02% | 0.02% | — |
| Linear Dibasic Ester Solvent | — | — | — | 0.02% |
| Co-Solvent | — | 0.02% | — | — |
| Ethoxylated Alcohol | — | 0.02% | — | 0.02% |
| Resin Alkoxylated Oligomer | — | 0.02% | — | — |
| Polyamine Polyether | — | 0.02% | — | — |

Each sample was blended, and the polyacrylamide-based friction reducer in each sample was allowed to hydrate for 4 minutes and 10 seconds at room temperature. The viscosity of each samples was then measured at the following 40

Figure 2:
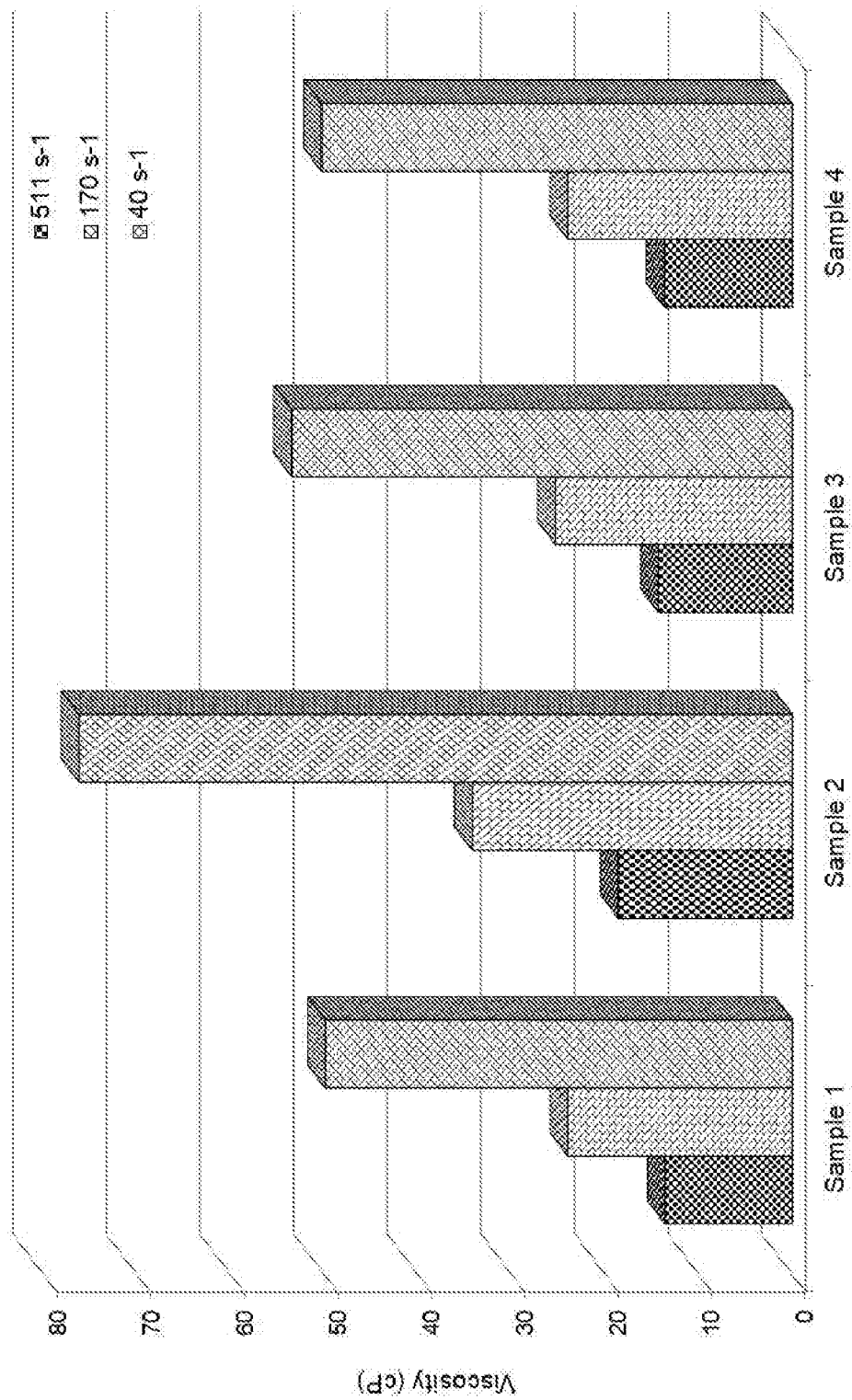
FIG. 2 is a graph illustrating viscosity measurements of compositions in accordance with certain embodiments of the present disclosure.

$s^{-1}$, 170 $s^{-1}$, and 511 $s^{-1}$ shear rates using an Anton Paar Model 501 rheometer equipped with double gap and cone-plate measuring arrangements. The results are shown in FIG. 2. As shown in FIG. 2, the inclusion of a dewatering agent with a friction reducer according to certain embodiments of the present disclosure resulted in a synergistic improvement of the viscosity of the fluid samples (Sample 2) as compared to the inclusion of the friction reducer alone (Sample 1), particularly at a low shear rate (40 $s^{-1}$). As also shown in FIG. 2, the component of the dewatering agent that appears to be most responsible for this synergistic effect is the solvent comprising a branched dibasic ester (Sample 3). As further shown in FIG. 2, a solvent comprising a linear dibasic ester (Sample 4) does not perform as well as the branched dibasic ester (Sample 3).

An embodiment of the present disclosure is a method that includes: providing an aqueous fluid comprising water and one or more water-soluble monomers; providing an oil-based fluid comprising a solvent and one or more polymerization surfactants, wherein the solvent comprises a linear or branched dibasic ester selected from the group consisting of: (a) $CH_3OC(O)(CH_2)_xC(O)OCH_3$, wherein x is from about 2 to about 10, (b) $CH_3OC(O)(CH_2)_xCHCH_3(CH_2)_yC(O)OCH_3$, wherein x and y are each independently from about 2 to about 10, (c) $CH_3OC(O)(CH_2)_xC(CH_3)_2(CH_2)_yC(O)OCH_3$, x and y are each independently from about 2 to about 10, (d)

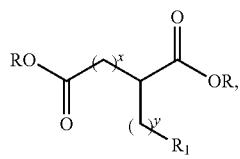

wherein x is from about 0 to about 10, wherein y is from about 0 to about 6, wherein each R is independently selected from the group consisting of: methyl, ethyl, n-propyl, iso-propyl, n-butyl, and sec-butyl, and wherein $R_1$ is H or $CH_3$, (e)

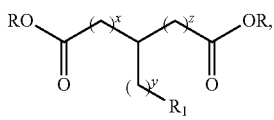

wherein x and z are each independently from about 0 to about 10, wherein y is from about 0 to about 6, wherein each R is independently selected from the group consisting of: methyl, ethyl, n-propyl, iso-propyl, n-butyl, and sec-butyl, and wherein $R_1$ is H or $CH_3$, and (f) any combination thereof combining the aqueous fluid and the oil-based fluid to form an invert emulsion that comprises an aqueous phase comprising the aqueous fluid and an oil phase comprising the oil-based fluid; and polymerizing at least a portion of the one or more water-soluble monomers in the invert emulsion.

In one or more embodiments described in the preceding paragraph, degassing or purging the invert emulsion. In one or more embodiments described in the preceding paragraph, combining the aqueous fluid and the oil-based to form an invert emulsion comprises mixing the aqueous fluid and the oil-based fluid under high shear to form an invert emulsion. In one or more embodiments described in the preceding paragraph, heating the invert emulsion to initiate polymerization of at least a portion of the one or more water-soluble monomers. In one or more embodiments described in the preceding paragraph, adding an initiator to the invert emulsion. In one or more embodiments described in the preceding paragraph, adding one or more inverting surfactants to the invert emulsion. In one or more embodiments described in the preceding paragraph, deactivating one or more unreacted water-soluble monomers or a moiety thereof. In one or more embodiments described in the preceding paragraph, wherein deactivating one or more unreacted water-soluble monomers or a moiety thereof comprises adding sodium bisulfate to the invert emulsion. In one or more embodiments described in the preceding paragraph, adding the invert emulsion to a treatment fluid. In one or more embodiments described in the preceding paragraph, introducing the treatment fluid into at least a portion of a subterranean formation. In one or more embodiments described in the preceding paragraph, wherein a polyacrylamide-based material is formed by polymerizing at least the portion the one or more water-soluble monomers. In one or more embodiments described in the preceding paragraph, wherein the polyacrylamide-based material is introduced into at least a portion of a subterranean formation.

An embodiment of the present disclosure is a method that includes: introducing a treatment fluid comprising an invert emulsion into at least a portion of a subterranean formation, wherein the invert emulsion is formed by combining: (i) an aqueous fluid comprising water and one or more water-soluble monomers and (ii) an oil-based fluid comprising a solvent and one or more polymerization surfactants, and wherein the solvent comprises a linear or branched dibasic ester selected from the group consisting of: (a) $CH_3OC(O)(CH_2)_xC(O)OCH_3$, wherein x is from about 2 to about 10, (b) $CH_3OC(O)(CH_2)_xCHCH_3(CH_2)_yC(O)OCH_3$, wherein x and y are each independently from about 2 to about 10, (c) $CH_3OC(O)(CH_2)_xC(CH_3)_2(CH_2)_yC(O)OCH_3$, x and y are each independently from about 2 to about 10, (d)

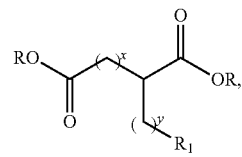

wherein x is from about 0 to about 10, wherein y is from about 0 to about 6, wherein each R is independently selected from the group consisting of: methyl, ethyl, n-propyl, iso-propyl, n-butyl, and sec-butyl, and wherein $R_1$ is H or $CH_3$, (e)

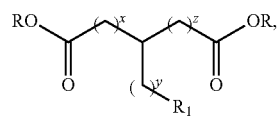

wherein x and z are each independently from about 0 to about 10, wherein y is from about 0 to about 6, wherein each R is independently selected from the group consisting of: methyl, ethyl, n-propyl, iso-propyl, n-butyl, and sec-butyl, and wherein $R_1$ is H or $CH_3$, and (f) any combination thereof.

In one or more embodiments described in the preceding paragraph, wherein at least a portion of the one or more water-soluble monomers are polymerized with the one or more polymerization surfactants in the invert emulsion to form a polyacrylamide-based material. In one or more embodiments described in the preceding paragraph, wherein the one or more water-soluble monomers are selected from the group consisting of: acrylic acid, 2-acrylamido-2-methylpropane sulfonic acid, 2-(meth)acrylamido-2-methylpropane sulfonic acid, 2-amino-2-methyl-1-propanol, [2-(acryloyloxy)ethyl]trimethylammonium chloride, methacrylamidopropyl trimethyl ammonium chloride, acrylamidopropyl trimethyl ammonium chloride, methacrylamido-4,4,8,8-tetramethyl-4,8-diaza-6-hydroxylnonamethylene dichloride, diallyldimethyl ammonium chloride, acrylamide, a $C_1$ to $C_{30}$ acrylic ester, methacrylamide, a $C_1$ to $C_{30}$ methacrylic ester, any salt thereof, any derivative thereof, and any combination thereof. In one or more embodiments described in the preceding paragraph, adding one or more inverting surfactants to the invert emulsion.

An embodiment of the present disclosure is a method that includes: providing an aqueous fluid comprising water and one or more water-soluble monomers; providing an oil-based fluid comprising one or more polymerization surfactants and a solvent that comprises, a linear or branched dibasic ester; combining the aqueous fluid and the oil-based fluid to form an invert emulsion that comprises an aqueous phase comprising the aqueous fluid and an oil phase comprising the oil-based fluid; and polymerizing at least a portion of the one or more water-soluble monomers in the invert emulsion.

In one or more embodiments described in the preceding paragraph, wherein the linear or branched dibasic ester is selected from the group consisting of: (a) $CH_3OC(O)(CH_2)_xC(O)OCH_3$, wherein x is from about 2 to about 10, (b) $CH_3OC(O)(CH_2)_xCHCH_3(CH_2)_yC(O)OCH_3$, wherein x and y are each independently from about 2 to about 10, (c) $CH_3OC(O)(CH_2)_xC(CH_3)_2(CH_2)_yC(O)OCH_3$, x and y are each independently from about 2 to about 10, (d)

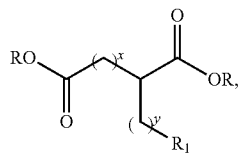

wherein x is from about 0 to about 10, wherein y is from about 0 to about 6, wherein each R is independently selected from the group consisting of: methyl, ethyl, n-propyl, iso-propyl, n-butyl, and sec-butyl, and wherein $R_1$ is H or $CH_3$, (e)

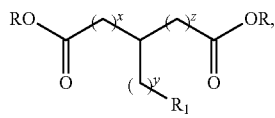

wherein x and z are each independently from about 0 to about 10, wherein y is from about 0 to about 6, wherein each R is independently selected from the group consisting of: methyl, ethyl, n-propyl, iso-propyl, n-butyl, and sec-butyl, and wherein $R_1$ is H or $CH_3$, and (f) any combination thereof. In one or more embodiments described in the preceding paragraph, adding the invert emulsion to a treatment fluid. In one or more embodiments described in the preceding paragraph, introducing the treatment fluid into at least a portion of a subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing an aqueous fluid comprising water and one or more water-soluble monomers;
providing an oil-based fluid comprising a solvent and one or more polymerization surfactants,
wherein the solvent comprises a linear or branched dibasic ester selected from the group consisting of:
(a) $CH_3OC(O)(CH_2)_xC(O)OCH_3$, wherein x is from about 2 to about 10,
(b) $CH_3OC(O)(CH_2)_xCHCH_3(CH_2)_yC(O)OCH_3$, wherein x and y are each independently from about 2 to about 10,
(c) $CH_3OC(O)(CH_2)_xC(CH_3)_2(CH_2)_yC(O)OCH_3$, x and y are each independently from about 2 to about 10,
(d)

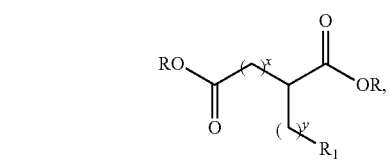

wherein x is from about 0 to about 10, wherein y is from about 0 to about 6, wherein each R is independently selected from the group consisting of: methyl, ethyl, n-propyl, iso-propyl, n-butyl, and sec-butyl, and wherein $R_1$ is H or $CH_3$,
(e)

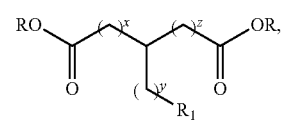

wherein x and z are each independently from about 0 to about 10, wherein y is from about 0 to about 6, wherein each R is independently selected from the group consisting of: methyl, ethyl, n-propyl, iso-propyl, n-butyl, and sec-butyl, and wherein $R_1$ is H or $CH_3$, and (f) any combination thereof;
combining the aqueous fluid and the oil-based fluid to form an invert emulsion that comprises an aqueous phase comprising the aqueous fluid and an oil phase comprising the oil-based fluid;
polymerizing at least a portion of the one or more water-soluble monomers in the invert emulsion;
adding the invert emulsion to a treatment fluid; and
introducing the treatment fluid into at least a portion of a subterranean formation.

2. The method of claim 1 further comprising degassing or purging the invert emulsion.

3. The method of claim 1, wherein combining the aqueous fluid and the oil-based to form an invert emulsion comprises mixing the aqueous fluid and the oil-based fluid under high shear to form an invert emulsion.

4. The method of claim 1 further comprising heating the invert emulsion to initiate polymerization of at least a portion of the one or more water-soluble monomers.

5. The method of claim 1 further comprising adding an initiator to the invert emulsion.

6. The method of claim 1 further comprising adding one or more inverting surfactants to the invert emulsion.

7. The method of claim 1 further comprising deactivating one or more unreacted water-soluble monomers or a moiety thereof.

8. The method of claim 7 wherein deactivating one or more unreacted water-soluble monomers or a moiety thereof comprises adding sodium bisulfate to the invert emulsion.

9. The method of claim 1 wherein a polyacrylamide-based material is formed by polymerizing at least the portion the one or more water-soluble monomers.

10. The method of claim 9 wherein the polyacrylamide-based material is introduced into at least a portion of a subterranean formation.

11. A method comprising:
introducing a treatment fluid comprising an invert emulsion into at least a portion of a subterranean formation, wherein the invert emulsion is formed by combining: (i) an aqueous fluid comprising water and one or more water-soluble monomers and (ii) an oil-based fluid comprising a solvent and one or more polymerization surfactants, and
wherein the solvent comprises a linear or branched dibasic ester selected from the group consisting of:
(a) $CH_3OC(O)(CH_2)_xC(O)OCH_3$, wherein x is from about 2 to about 10,
(b) $CH_3OC(O)(CH_2)_xCHCH_3(CH_2)_yC(O)OCH_3$, wherein x and y are each independently from about 2 to about 10,
(c) $CH_3OC(O)(CH_2)_xC(CH_3)_2(CH_2)_yC(O)OCH_3$, x and y are each independently from about 2 to about 10,
(d)

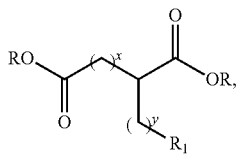

wherein x is from about 0 to about 10, wherein y is from about 0 to about 6, wherein each R is independently selected from the group consisting of: methyl, ethyl, n-propyl, iso-propyl, n-butyl, and sec-butyl, and wherein $R_1$ is H or $CH_3$,
(e)

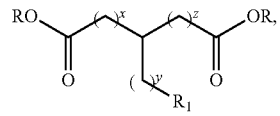

wherein x and z are each independently from about 0 to about 10, wherein y is from about 0 to about 6, wherein each R is independently selected from the group consisting of: methyl, ethyl, n-propyl, iso-propyl, n-butyl, and sec-butyl, and wherein $R_1$ is H or $CH_3$, and (f) any combination thereof.

12. The method of claim 11 wherein at least a portion of the one or more water-soluble monomers are polymerized with the one or more polymerization surfactants in the invert emulsion to form a polyacrylamide-based material.

13. The method of claim 11 wherein the one or more water-soluble monomers are selected from the group consisting of: acrylic acid, 2-acrylamido-2-methylpropane sulfonic acid, 2-(meth)acrylamido-2-methylpropane sulfonic acid, 2-amino-2-methyl-1-propanol, [2-(acryloyloxy)ethyl]trimethylammonium chloride, methacrylamidopropyl trimethyl ammonium chloride, acrylamidopropyl trimethyl ammonium chloride, methacrylamido-4,4,8,8-tetramethyl-4,8-diaza-6-hydroxylnonamethylene dichloride, diallyldimethyl ammonium chloride, acrylamide, a $C_1$ to $C_{30}$ acrylic ester, methacrylamide, a $C_1$ to $C_{30}$ methacrylic ester, any salt thereof, any derivative thereof, and any combination thereof.

14. The method of claim 11 further comprising adding one or more inverting surfactants to the invert emulsion.

15. A method comprising:
providing an aqueous fluid comprising water and one or more water-soluble monomers;
providing an oil-based fluid comprising one or more polymerization surfactants and a solvent that comprises, a linear or branched dibasic ester;
combining the aqueous fluid and the oil-based fluid to form an invert emulsion that comprises an aqueous phase comprising the aqueous fluid and an oil phase comprising the oil-based fluid;
polymerizing at least a portion of the one or more water-soluble monomers in the invert emulsion;
adding the invert emulsion to a treatment fluid; and
introducing the treatment fluid into at least a portion of a subterranean formation.

16. The method of claim 15 wherein the linear or branched dibasic ester is selected from the group consisting of:
(a) $CH_3OC(O)(CH_2)_xC(O)OCH_3$, wherein x is from about 2 to about 10,
(b) $CH_3OC(O)(CH_2)_xCHCH_3(CH_2)_yC(O)OCH_3$, wherein x and y are each independently from about 2 to about 10,
(c) $CH_3OC(O)(CH_2)_xC(CH_3)_2(CH_2)_yC(O)OCH_3$, x and y are each independently from about 2 to about 10, (d)

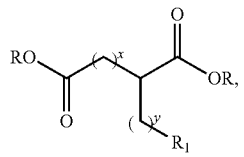

wherein x is from about 0 to about 10, wherein y is from about 0 to about 6, wherein each R is independently selected from the group consisting of: methyl, ethyl, n-propyl, iso-propyl, n-butyl, and sec-butyl, and wherein $R_1$ is H or $CH_3$, (e)

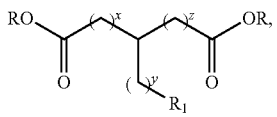

wherein x and z are each independently from about 0 to about 10, wherein y is from about 0 to about 6, wherein each R is independently selected from the group consisting of: methyl, ethyl, n-propyl, iso-propyl, n-butyl, and sec-butyl, and wherein $R_1$ is H or $CH_3$, and (f) any combination thereof.

* * * * *